United States Patent [19]
Lau et al.

[11] Patent Number: 5,467,425
[45] Date of Patent: Nov. 14, 1995

[54] BUILDING SCALABLE N-GRAM LANGUAGE MODELS USING MAXIMUM LIKELIHOOD MAXIMUM ENTROPY N-GRAM MODELS

[75] Inventors: Raymond Lau, Cambridge, Mass.; Ronald Rosenfeld, Pittsburgh, Pa.; Salim Roukos, Scarsdale, N.Y.

[73] Assignee: International Business Machines Corporation, Armonk, N.Y.

[21] Appl. No.: 23,543

[22] Filed: Feb. 26, 1993

[51] Int. Cl.$^6$ ............................................. G10L 9/00
[52] U.S. Cl. ...................... 395/2.52; 395/2.49; 395/2.64
[58] Field of Search ..................... 381/41,46; 395/2.4, 395/2.49, 2.45, 2.52–2.54, 2.59, 2.64–2.66

[56] References Cited

U.S. PATENT DOCUMENTS

| | | | |
|---|---|---|---|
| 4,817,156 | 3/1989 | Bahl et al. | 395/2.53 |
| 4,831,550 | 5/1989 | Katz | 395/2.49 |
| 5,293,584 | 3/1994 | Brown et al. | 395/2.66 |

OTHER PUBLICATIONS

Jelinke et al., "Classifying Words for Improved Statistical Language Models", ICASSP '90, pp. 621–624, 1990.
Ney et al., "On Smoothing Techniques for Bigram-Based Natural Language Modelling", ICAASP '91, pp. 825–828, 1991.
Passeler et al., "Continuous-Speech Recogniton Using a Stochastic Language Model", ICASSP '89, pp. 719–722, 1989.
Lalit R. Bahl, Frederick Jelinek, and Robert L. Mercer, *A Maximum Likelihood Approach to Continuous Speech Recognition*, IEEE Transactions on Pattern Analysis and Machine Intelligence, vol. PAMI-5, No. 2, Mar. 1983, pp. 179–190.

*Primary Examiner*—Allen R. MacDonald
*Assistant Examiner*—Michelle Doerrler
*Attorney, Agent, or Firm*—Sterne, Kessler, Goldstein & Fox; Robert Tasinari

[57] ABSTRACT

The present invention is an n-gram language modeler which significantly reduces the memory storage requirement and convergence time for language modelling systems and methods. The present invention aligns each n-gram with one of "n" number of non-intersecting classes. A count is determined for each n-gram representing the number of times each n-gram occurred in the training data. The n-grams are separated into classes and complement counts are determined. Using these counts and complement counts factors are determined, one factor for each class, using an iterative scaling algorithm. The language model probability, i.e., the probability that a word occurs given the occurrence of the previous two words, is determined using these factors.

21 Claims, 9 Drawing Sheets

| w1 | w2 | w3 | c |
|---|---|---|---|
| 2 | 2 | 1 | 5 |
| 2 | 2 | 4 | 2 |
| 2 | 2 | 8 | 1 |
| 2 | 3 | 2 | 3 |
| 2 | 3 | 4 | 2 |
| 4 | 2 | 1 | 2 |
| 7 | 2 | 1 | 1 |
| 7 | 3 | 4 | 1 |
| 7 | 3 | 8 | 1 |

FIG.5a

| w1 | w2 | w3 | c |
|---|---|---|---|
| 2 | 2 | 4 | 2 |
| 2 | 2 | 8 | 1 |
| 2 | 3 | 4 | 2 |
| 4 | 2 | 1 | 2 |
| 7 | 2 | 1 | 1 |
| 7 | 3 | 4 | 1 |
| 7 | 3 | 8 | 1 |

FIG.5b

| w2 | w3 | cc(.) |
|---|---|---|
| 2 | 4 | 2 |
| 2 | 8 | 1 |
| 3 | 4 | 3 |
| 2 | 1 | 3 |
| 3 | 8 | 1 |

FIG.5c

| w2 | w3 | cc(.) |
|---|---|---|
| 2 | 4 | 2 |
| 2 | 8 | 1 |
| 3 | 8 | 1 |

FIG.5d

| w1 | w2 | w3 | c |
|---|---|---|---|
| 2 | 2 | 4 | 2 |
| 2 | 2 | 8 | 1 |
| 7 | 3 | 8 | 1 |

FIG.5e

| w3 | cc(.) |
|---|---|
| 4 | 2 |
| 8 | 2 |

FIG.5f $$
\begin{array}{c|cc}
S_{123} & (1,1,1) & (2,2,3) \\
 & (1,1,2) & (3,1,1) \\
 & (2,1,2) & (3,3,3) \\
 & (2,1,3) & (2,2,1) \\
\hline
S_{23} & (w,1,1) & (w,2,3) \\
 & (w,1,2) & (w,3,3) \\
 & (w,1,3) & (W,2,1) \\
\hline
S_3 & (w,w,1) & (w,w,2) \\
 & & (w,w,3) \\
\hline
CC_0 = 0
\end{array}
$$

FIG.8

$$
\begin{array}{c|cc}
S_{123} & (1,1,1) & (2,2,1) \\
 & (1,1,2) & (3,1,1) \\
 & (2,1,2) & \\
 & (2,1,3) & \\
\hline
S_{23} & \varnothing & \\
\hline
S_3 & (w,w,3) = \{(2,2,3),(3,3,3)\} \\
\hline
CC_0 = 0
\end{array}
$$

FIG.7

| $w_1$ | $w_2$ | $w_3$ | c |
|---|---|---|---|
| 1 | 1 | 1 | 4 |
| 1 | 1 | 2 | 4 |
| 2 | 1 | 2 | 5 |
| 2 | 1 | 3 | 8 |
| 2 | 2 | 3 | 2 |
| 3 | 3 | 1 | 4 |
| 3 | 3 | 3 | 2 |
| 2 | 2 | 1 | 5 |

FIG.6

BUILDING SCALABLE N-GRAM LANGUAGE MODELS USING MAXIMUM LIKELIHOOD MAXIMUM ENTROPY N-GRAM MODELS

TECHNICAL FIELD

The present invention relates to n-gram language modeling. Specifically, the present invention relates to speech recognizers, language translators, spelling checkers, optical character recognizers, handwriting recognizers and other devices which generate and score n-word series hypotheses.

BACKGROUND ART

Language models have been used in many areas to predict an outcome based on previous data. With respect to speech recognition, products which recognize continuously spoken small vocabularies have been on the market for over a decade. However a more important goal is to develop speech recognition systems capable of recognizing unrestricted continuous speech.

Certain automatic speech recognition devices, automatic language translation devices, and automatic spelling correction devices have been known to operate according to the model shown in Equation (1).

$$p(w|y) = \frac{p(w)p(y|w)}{p(y)} \quad (1)$$

In this model, w is a word-series hypothesis representing a series of one or more words, for example English-language words. The term p(w) is the probability of occurrence of the word-series hypothesis. The variable y is an observed signal, and p(y) is the probability of occurrence of the observed signal. p(w|y) is the probability of occurrence of the word-series w, given the occurrence of the observed signal y. P(y|w) is the probability of occurrence of the observed signal y, given the occurrence of the word-series w.

For automatic speech recognition, y is an acoustic signal. See L. R. Bahl, et al. "A Maximum Likelihood Approach to Continuous Speech Recognition." *IEEE Transactions on Pattern Analysis and Machine Intelligence,* Volume PAMI-5, No. 2, March 1983, pages 179–190, herein incorporated by reference. For automatic language translation, y is a sequence of words in another language different from the language of the word-series hypothesis. See P. F. Brown, et al. "A Statistical Approach To Machine Translation." *Computational Linguistics,* Vol. 16, No. 2, June 1990, pages 79–85. For automatic spelling correction, y is a sequence of characters produced by a possibly imperfect typist. See E. Mays, et al. "Context Based Spelling Correction." *Information Processing & Management,* Vol. 27, No. 5, 1991, pages 517–522.

In all three applications, given a signal y, one seeks to determine the series of English words, w, which gave rise to the signal y. In general, many different word series can give rise to the same signal y. The model minimizes the probability of choosing an erroneous word series by selecting the word series w having the largest conditional probability given the observed signal y.

As shown in Equation (1), the conditional probability of the word series w given the observed signal y is the combination of three terms: (i) the probability of the word series w, multiplied by (ii) the probability that the observed signal y will be produced when the word-series w is intended, divided by (iii) the probability of observing the signal y.

In the case of automatic speech recognition, the probability of the acoustic signal y given the hypothesized word series w is estimated by using an acoustic model of the word series w. In automatic language translation, the probability of the sequence of words y in another language given the hypothesized English-translation word series w is estimated by using a translation model for the word series w. In automatic spelling correction, the probability of the sequence of characters y produced by a possibly imperfect typist given the hypothesized word series w is estimated by using a mistyping model for the word series w.

In these types of applications, the probability of the word series w can be modeled according to the equation:

$$p(w_1^k) = p(w_1)p(w_2|w_1) \ldots p(w_k|w_1^{k-1}) \quad (2)$$

where $w_1^k$ represents a series of words $w_1, w_2, \ldots, w_k$.

In the conditional probability $p(w_k|w_1^{k-1})$, the term $w_1^{k-1}$ is called the history or the predictor feature and represents the initial (k-1) words of the word series. Each word in the history is a predictor word. The term $w_k$ is called the predicted feature or the category feature.

The mechanism for estimating the conditional probabilities in Equation (2) is a language model. A language model estimates the conditional probabilities from limited training text (training data). The larger the training text, and the larger the number of parameters in the language model, the more accurate and precise are the predictions from the language model.

As stated above, a purpose of a language model is to assign probabilities to a word series, e.g., the probability of a trigram $w_1w_2w_3$, given that bigram $w_1w_2$ has just occurred.

A previously successful language model is a trigram model based upon deleted interpolation as described in Bahl, et al., "A Maximum Likelihood Approach to Continuous Speech Recognition", *IEEE Transactions on Pattern Analysis and Machine Intelligence,* Vol. PAMI-5, No. 2, pp. 179–190 (March 1983).

This trigram model is based upon deleted interpolation. This model requires the storage of records that identify: (a) a trigram id $w_1w_2w_3$ and its count $c(w_1w_2w_3)$; (b) a bigram identification $w_2w_3$ and its count $c(w_2w_3)$; and (c) a unigram identification $w_3$ and its count $c(w_3)$. The count of a given trigram is the number of occurrences of this given trigram in the training data. Significant redundancy exists in this model because a particular bigram can be included as part of the trigram count and as part of the bigram count, i.e., a given $w_2w_3$ can be counted twice, thereby increasing the amount of storage required. This redundancy is shown by Equation (3) which shows that the bigram count is the sum of the corresponding trigram counts.

$$c(w_2w_3) = \sum_{w_1 \in v} c(w_1w_2w_3) \quad (3)$$

The probability assigned to the next word by this trigram model is shown in Equation (4)

$$p(w_3|w_2,w_1) = \lambda_3 \frac{c(w_1w_2w_3)}{c(w_1w_2)} + \lambda_2 \frac{c(w_2w_3)}{c(w_2)} + \quad (4)$$

-continued $$\lambda_1 \frac{c(w_3)}{N} + \lambda_0 \frac{1}{V}$$

where V is the vocabulary size, in number of words, N is the size of the training data in number of words, and the $\lambda_i$'s (i=0, . . . , 3) are the smoothing parameters. The smoothing parameters are the relative weight given to each quotient of Equation (4). The smoothing parameters are estimated by using a portion of the training data. A percentage, e.g. five percent, of the training data is not used as training data. Instead this percentage of data is "held-out", i.e., not used to train the language model. Instead this held-out data is used to fine-tune the smoothing parameters. The smoothing parameters are estimated by maximizing the likelihood of this held-out data. This procedure is more fully described in Bahl, et al., "A Maximum Likelihood Approach to Continuous Speech Recognition", *IEEE Transactions on Pattern Analysis and Machine Intelligence*, Vol. PAMI-5, No. 2, pp. 179–190 (March 1983).

The storage requirements for trigram based language models are predominately dominated by the trigram record storage. A method and system to reduce the memory requirement of language models without a significant reduction in performance is needed.

DISCLOSURE OF THE INVENTION

The present invention is a system and method for creating a language model. The system and method comprise a means for accepting training data in the form of discrete words. A partition space is divided into non-overlapping classes. A count is determined for all classes in the training data. For simplicity, trigrams are discussed. All trigrams with a count larger than a first threshold value are placed its own class. A complement count is determined for all remaining putative bigram classes, each putative bigram class consists of bigrams whose trigram equivalent is not previously associated with a class. All putative bigram classes with a complement count larger than a second threshold value are identified as a class. Each of these classes consists of potentially many trigrams each of which has the same $w_2w_3$. A complement count is determined for all remaining putative unigram classes, each putative unigram class consists of unigrams, $w_3$, whose trigram or bigram equivalent is not previously associated with a class. All unigrams with a complement count larger than a third threshold value are identified as a class. Each of these classes consists of potentially many trigrams each of which has the same $w_3$. The complement counts of the remaining putative unigram classes are summed together, this total is termed the default constraint. The default constraint is the default class in the partition space. Using the class counts and complement counts, which are stored in class count memory locations, factors are determined for each class, these factors represent the relative strength of predicting a word given the previous two words. The language model system and method then uses these factors to determine the probability of a given word occurring given that the previous two words have occurred.

BRIEF DESCRIPTION OF THE DRAWINGS

The foregoing and other objects, features and advantages of the invention will be apparent from the following more particular description of the preferred embodiments of the invention, as illustrated in the accompanying drawings, wherein:

FIGS. 5(a)–(f) together comprise a first example of how training data is affected by the present invention.

FIG. 6 is a second example of training data.

FIG. 7 is an illustration showing the results of the present invention on the second sample of training data using a first set of threshold values.

FIG. 8 is an illustration showing the results that a previous language model has on the second sample of training data.

BEST MODE FOR CARRYING OUT THE INVENTION

The system and method of the present invention involves building scalable n-gram language models. The invention improves old language models by reducing memory storage requirements and improving performance.

The claimed system and method may be used in many areas including language translators, e.g., French to English, spell checking systems, optical character recognition (OCR) and speech recognition, to name a few. The preferred embodiment of the present invention relates to speech recognition. However, it is understood that many other areas will benefit from the claimed system and method of the present invention.

Figure 1:
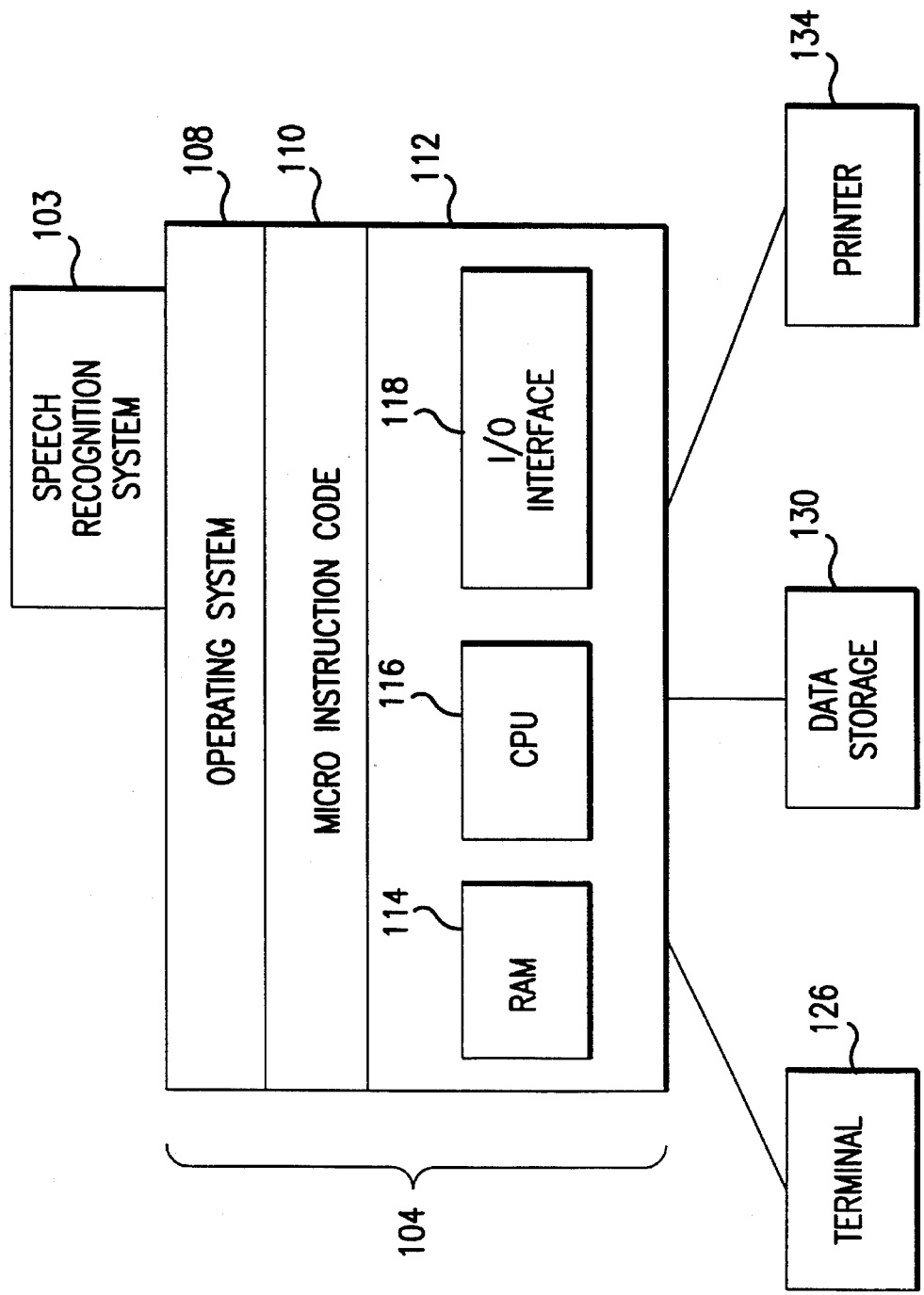
FIG. 1 is an illustration of a computer system incorporating the present speech recognition system.

FIG. 1 illustrates an environment in which a preferred embodiment of the present invention operates. The preferred embodiment of the present invention operates on a computer platform 104. The computer platform 104 includes certain hardware units 112 including one or more central processing units (CPU) 116, a random access memory (RAM) 114, and an input/output (I/O) interface 118. The computer platform 104 includes an operating system 108, and may include microinstruction code 110. A speech recognition system 103 may be part of the micro instruction code 110 or an application program to be executed via the operating system. Various peripheral components may be connected to the computer platform 104, such as a terminal 126, a data storage device 130, and a printing device 134.

Figure 2:
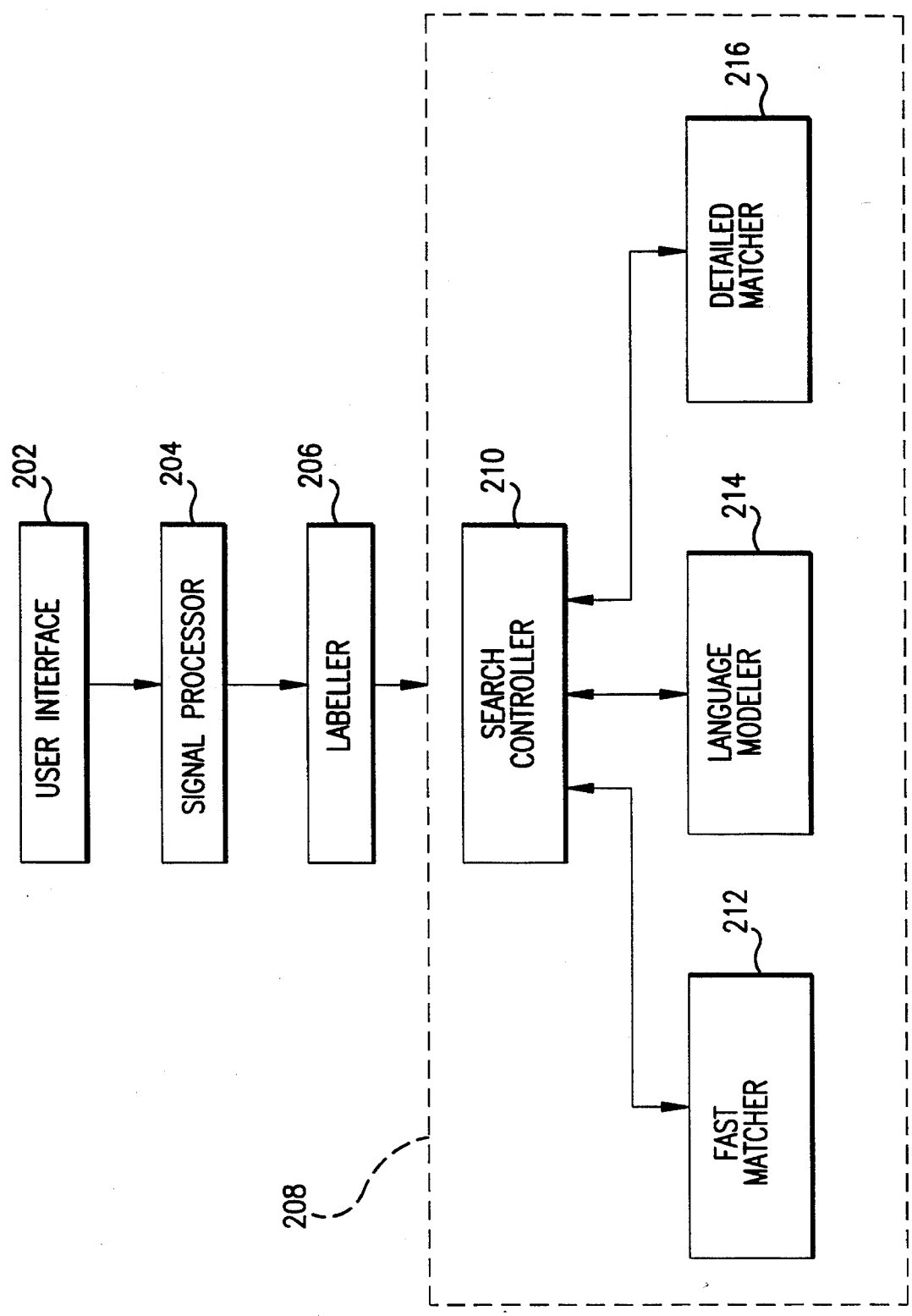
FIG. 2 is a more detailed illustration of the modules comprising the present speech recognition system.

FIG. 2 illustrates a more detailed description of the speech recognition system 103. A user interface 202 may include a microphone for generating an analog electrical signal corresponding to a speech utterance. An analog to digital converter may also be included in the user interface 202. The user interface 202 is coupled to a signal processor 204. The signal processor 204 receives the electrical signal output from the user interface 202 and produces a set of feature vectors signals. Signal processor 204 can include electronic components such as an analog-to-digital converter and a spectral analyzer. The output of the user interface 202 is coupled to the signal processor 204.

For each interval of time, i.e., a frame, the signal processor 204 examines n-characteristics of speech. Based upon the values of the n characteristics, an n-component feature vector signal is defined. In the preferred embodiment, the signal processor 204 extracts a series of feature vectors from the speech signal. One type of feature vector that can be extracted is based upon the frequency of the signal, e.g., an acoustic parameter vector signal. Measurement and spectral analysis of the speech signal by the signal processor 204 creates a frequency sensitive feature vector. The spectral analysis comprises measuring the energy of the speech signal for each time unit in a number of different frequency bands n, which may be approximately 20. The time unit, i.e., frame, is small. Therefore the creation of many, approximately 100, feature vectors occurs every second.

The output of the signal processor 204 is coupled to a labeller 206. For each feature vector the labeller 206 computes and associates a score for every label in a label alphabet. The labeller 206 then tags each feature vector with the label having the highest score. The scores for each label and the tagged feature vectors are output from labeller 206. The labeller 206 is coupled to a matcher 208. The matcher 208 comprises a search controller 210, a fast matcher 212, a language modeler 214 and a detailed matcher 216. The search controller 210 controls the activities of the other matcher modules, i.e., the fast matcher 212, the language modeler 214 and the detailed matcher 216. The fast matcher 212 is coupled to the search controller 210. The fast matcher 212 determines a list of potential words given the acoustic phonetics represented by the feature vectors. The language modeler 214 is coupled to the search controller 210. The language modeler 214 looks at a particular history i.e., a particular sequence of (n-1) words, the words being a previous output of the speech recognition module, and the list of potential words determined by the fast matcher and selects the most probable subset of this list of words based upon the one or more preceding words. The detailed marcher 216 is coupled to the search controller 210. The detailed marcher uses a more detailed acoustic model than the fast marcher 212 to determine which word of the subset, as determined by the language modeler 214 has the most accurate probability based upon the acoustic phonetics.

Figure 3:
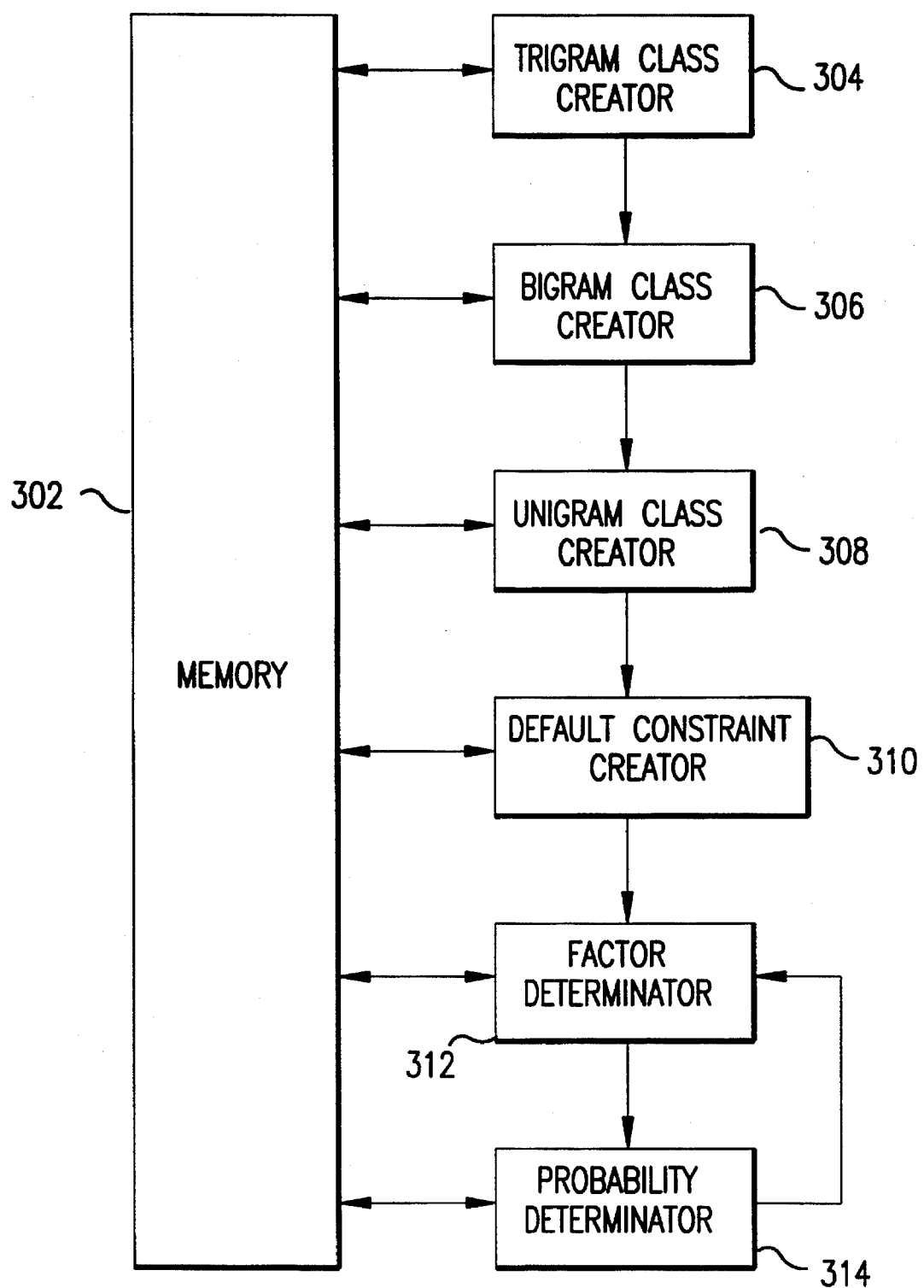
FIG. 3 is a more detailed illustration of the modules comprising the language modeler.
Figure 4A:
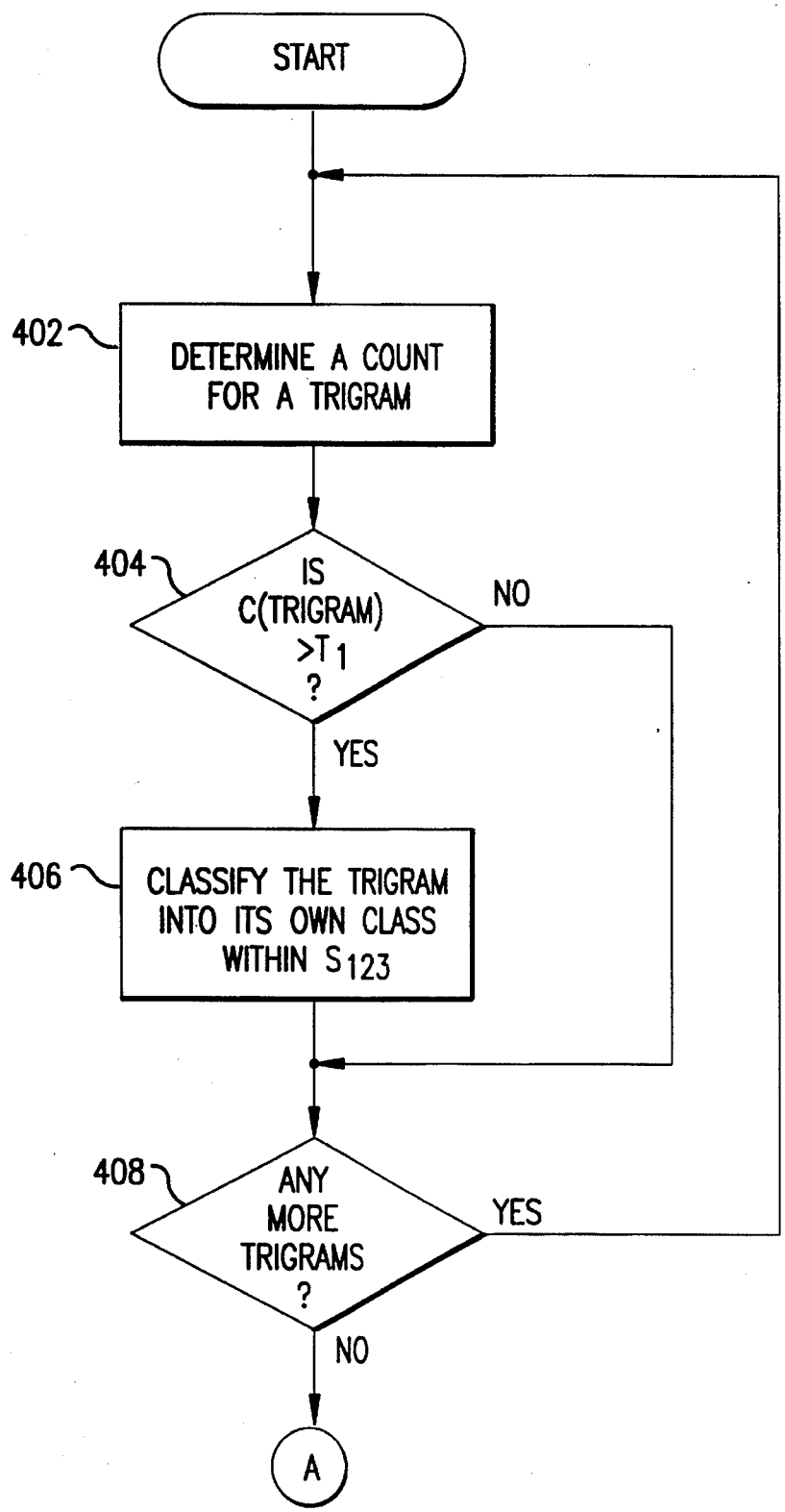
FIGS. 4(a)–(d) together comprise a flow diagram showing the method of the present invention's language modeler.
Figure 4B:
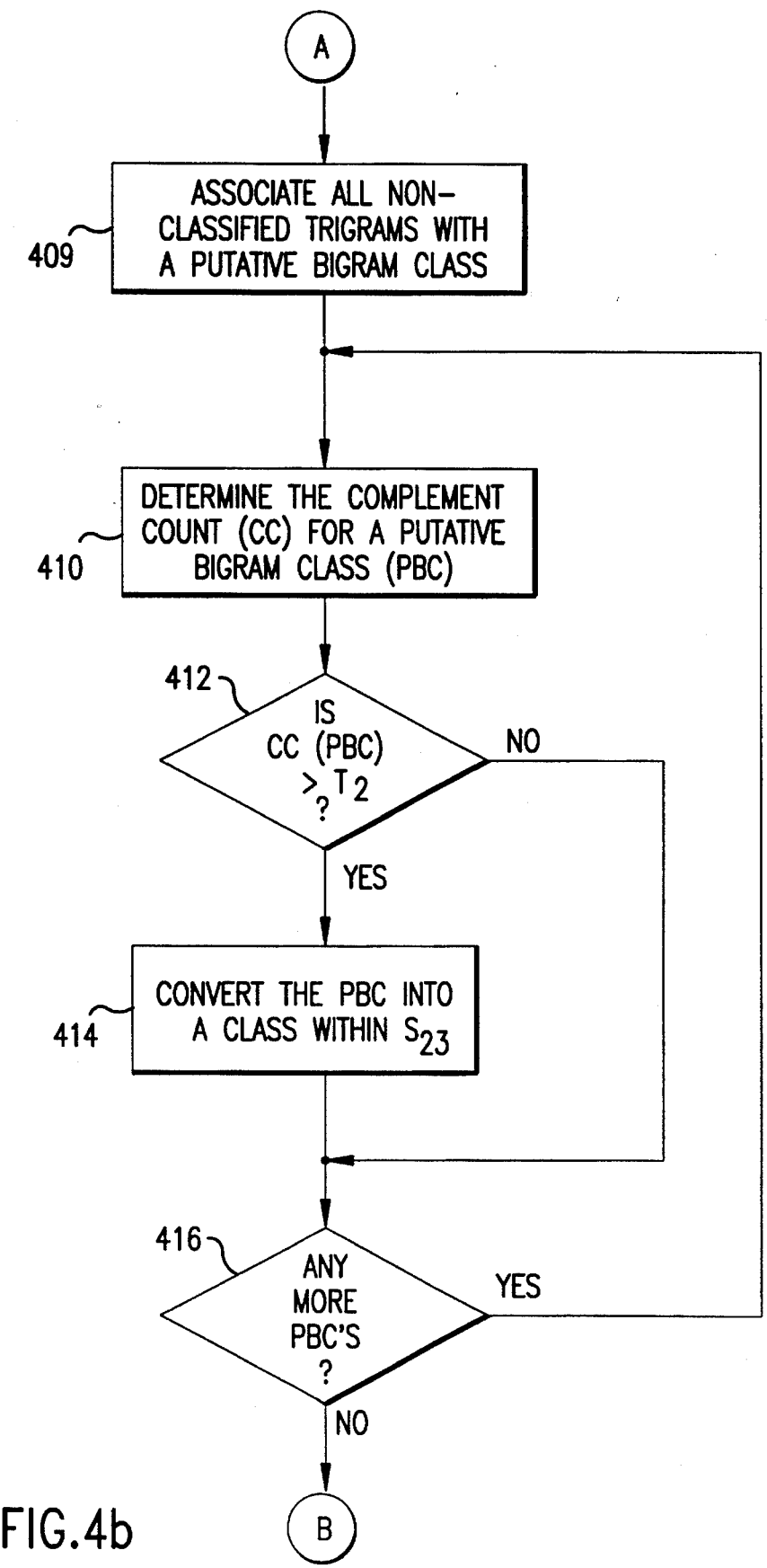
Figure 4C:
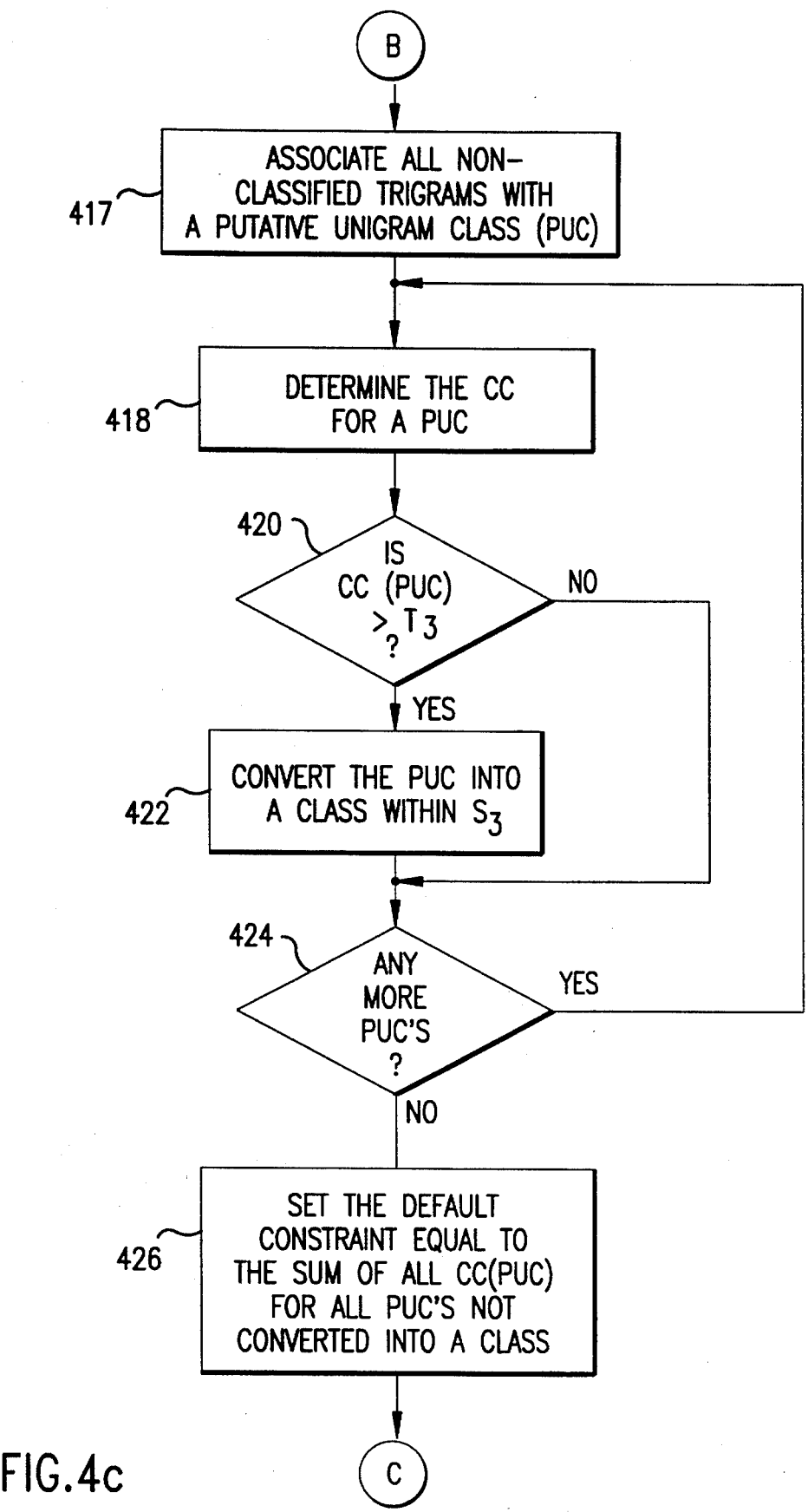
Figure 4D:
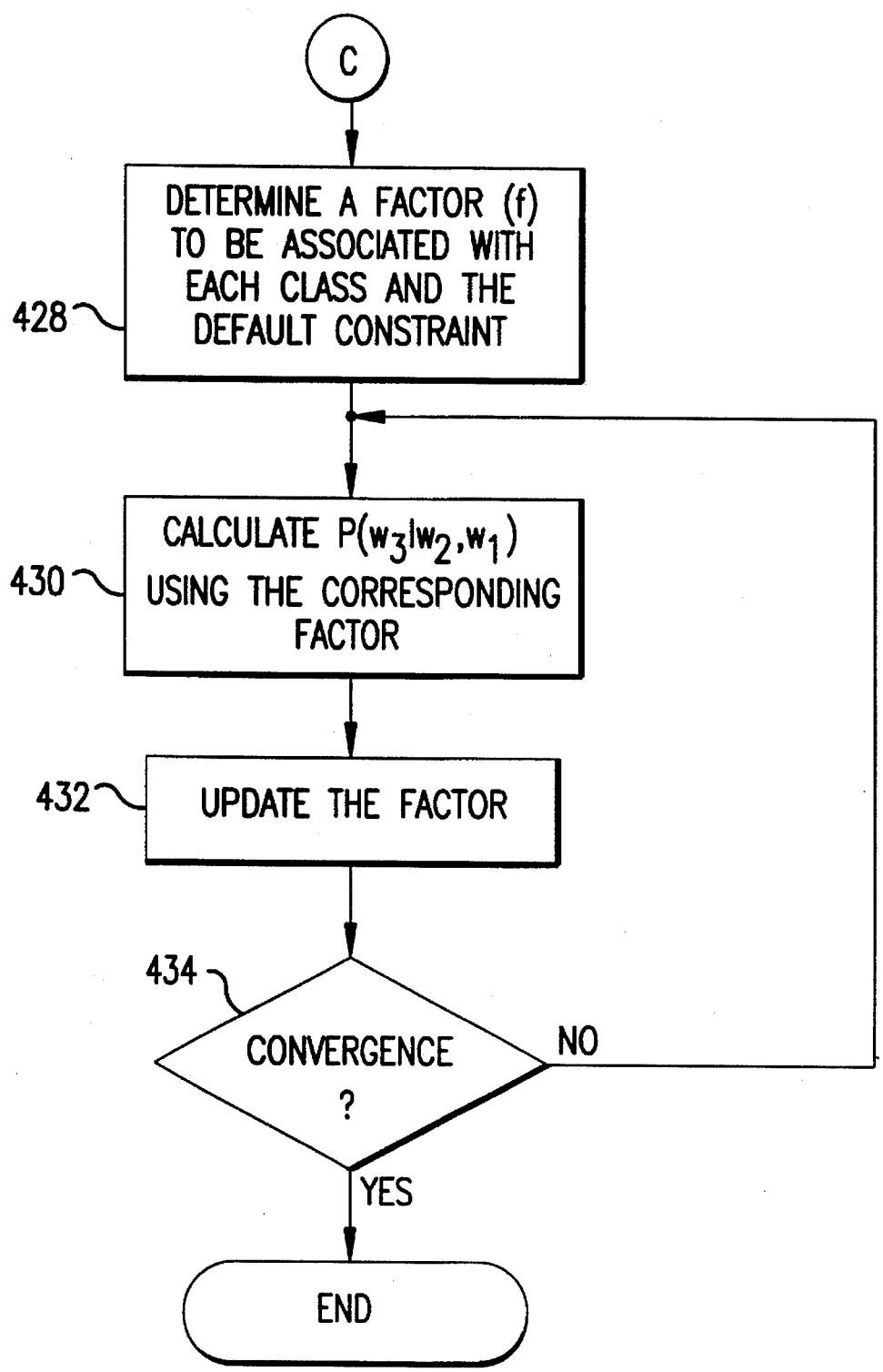

FIG. 3 illustrates a more detailed view of the language modeler 214. The memory device 302 can be one or a combination of more than one data storage devices, e.g. floppy disks or random access memory (RAM). The preferred embodiment of the invention uses a computer's internal random access memory (RAM) as the memory device 302. The present invention is a method and system for building scalable n-gram language models. In the preferred embodiment trigrams, i.e., n equal to three, are the basis of the language model. However, alternate values for n are contemplated.

A trigram class creator 304 is coupled to the memory device 302 and a bigram class creator 306. The bigram class creator 306 is coupled to the memory device 302 and a unigram class creator 308. The unigram class creator 308 is coupled to the memory device 302 and a default constraint creator 310. The default constraint creator 310 is coupled to the memory device 302 and a factor determinator 312. The factor determinator 312 is coupled to the memory device 302 and a probability determinator 314. The probability determinator is coupled to the memory device 302.

A purpose of the language modeler 214 is to determine a set of potential choices, using probabilities, of a current word based on a number of immediately preceding words, not directly based on acoustic information. This is shown in Equation (5) where $w_3$ is the current word, $w_2$ is the word immediately preceding the current word and $w_1$ is the word immediately preceding $w_2$.

$$P(w_3 | w_2, w_1) \quad (6)$$

p($w_3|w_2$, $w_1$) represents the probability that $w_3$ occurs given that the two previous words were $w_1 w_2$.

The fast matcher 212 determines a list of potential words. For each of these potential words the language modeler 214 determines a probability that a given word would occur given the previous n-1 words, i.e., the previous two words since in the preferred embodiment trigrams are utilized. The current invention provides a substantial performance increase over older language modelers, including the trigram model based upon deleted interpolation, discussed above. For trigram modeling three threshold values are chosen. The present invention allows flexibility with respect to the value of each threshold. These threshold values are a function of the amount of memory available for use by the language model. The larger amount of memory available, the lower the threshold values may be. The threshold values should remain above a minimum value, e.g., a minimum between two and five. Such a minimum value is required in order maintain proper performance of the language model as discussed below.

In training a language modeler, training data is input. Every sequence of three words in the training data is called a trigram. The counter tracks each occurrence of every trigram in the training data. The count of a given trigram is the number of occurrences of this given trigram in the training data. As will be seen, a more accurate and efficient language model is described in the present invention. Therefore no held-out data is necessary.

FIG. 4 illustrates the detailed method of the claimed invention. In the trigram class creator 304 the count for a given trigram is determined as described above, in step 402. The count is stored in memory device 302. In step 404 the trigram class creator 304 determines for each trigram whether its count is greater than the first threshold value. If the count is greater than the first threshold value, the trigram class creator 304 associates the given trigram with a trigram set, $S_{123}$, in step 406. Each trigram associated with set $S_{123}$ belongs to a class. The classes represent trigrams whose count is deemed reliable. The count is reliable because it exceeds a minimum threshold value as described above. In order to reduce the system's memory requirements the threshold value may exceed the minimum value. An example of how this is accomplished by the present invention is discussed below. Such an increase in the threshold value results in the exclusion of some reliable trigrams from set $S_{123}$. Such an occurrence does not significantly affect system performance because such excluded trigrams will be properly modeled in the remaining sets $S_{23}$ and $S_3$ defined below. Steps 402–406 are repeated for all trigrams in step 408.

After the establishment of set $S_{123}$, a complement count is determined in the bigram class creator 306 for all putative bigram classes. In step 409 all non-classified trigrams are associated with a putative bigram class. In step 409 all non-classified trigrams, i.e., trigrams not previously associated with a class, are grouped together into putative bigram classes. Each putative bigram class consists of all non-classified trigrams having the same particular last two words, i.e., $w_2 w_3$. The complement count for a given putative bigram class is determined in step 410 by summing the counts of all trigrams associated with the given putative bigram class. That is, the complement count of a putative bigram class is the count of all trigrams not associated with a class in $S_{123}$ whose bigram $w_2 w_3$ is the same. This is shown in Equation (6). Hereinafter the trigram $w w_2 w_3$, where w is any word such that $w w_2 w_3$ is not associated with any class in set $S_{123}$, is referred to as a bigram.

$$w \ni ww_2 \notin \overset{2}{} \overset{3}{} \tag{6}$$

For each putative bigram class a determination is made in step 412 as to whether its complement count is greater than the second threshold value. If the complement count is greater than the second threshold value then the given putative bigram class is converted into a class by saving the complement count and the class members in a memory location. The new class is also associated with bigram set $S_{23}$ as stated in step 414. The bigram set may contain many classes, each class consists of potentially many trigrams each of which has the same $w_2w_3$. Steps 410–414 are repeated for all putative bigram classes in step 416.

After the establishment of set $S_{23}$, a complement count is determined in the unigram class creator 308 for all putative unigram classes. In step 417 all non-classified trigrams are associated with a putative unigram class. The putative unigram classes are all potential classes that exist based upon all non-classified trigrams. Each putative unigram class contains all non-classified trigrams having the same last word, $w_3$. The complement count for a given putative unigram class is determined in step 418 by summing the counts of all trigrams associated with this class. Another way to determine the complement count of a given putative unigram class is to sum all putative bigram classes, which have not been converted into classes, having the same last word, $w_3$. This technique is shown in Equation (7). Hereinafter the trigram $www_3$ where w is any word such that $www_3$ is not associated with any class in sets $S_{123}$ or $S_{23}$ is referred to as a unigram.

$$cc(w_3) = \sum_{w \ni ww'\notin} \tag{7}$$

For each putative unigram class a determination is made in step 420 as to whether its complement count is greater than the third threshold value. If the complement count is greater than the third threshold value the putative unigram class is converted into a class by saving the complement count and the class members in a memory location. The new class is also associated with unigram set $S_3$ as stated in step 422. The unigram set may contain many classes, each class consists of potentially many trigrams each of which has the same $w_3$. Steps 418–422 are repeated for all putative bigram classes in step 424.

The system and method of the present invention, unlike the trigram model based upon deleted interpolation, associates each trigram, bigram and unigram with one and only one class. Therefore each trigram is only counted once. This is one technique in which the present invention reduces the language model's memory requirements.

After this process there may still be some trigrams not associated with any class. These remaining trigrams belong to a default class. The complement count for all putative unigram classes not in set $S_3$ are summed together in the default constraint creator 310 during step 426 as shown in Equation (8). The sum total count is stored in memory device 302 and is called the default constraint.

$$cc_0 = \sum_{w \ni w \notin} \tag{8}$$

The term "constraint counts" refers to the count of the classes, i.e., the counts of the classes in the trigram set, the complement counts of the classes in the bigram set, the complement counts of the classes in the unigram set and the default constraint. The counts of the classes are the constraints that a model uses, e.g. the generalized iterative scaling model or gradient descent model, described below. Every trigram belongs to only one class. Each class has a factor, $f_{w_1w_2w_3}$, associated with it. The value of the factor is the same for all trigrams within a particular class.

A factor is associated with each class of trigrams. The methods used to determine these factors are described below. Once the factors are determined in step 428, the probability determinator 314 in step 430 determines the probability of the next word by dividing the factor associated with trigram $w_1w_2w_3$ by the sum of the factors associated with trigrams having the same $w_1w_2$ as shown in Equation (9).

$$p(w_3|w_2,w_1) = \frac{f_{w_1w_2w_3}}{\sum_{w \in V} f_{w_1w_2w}} \tag{9}$$

The factors must be selected so that the probability model yields an expected value for the count of a class that $$f_{class} = \frac{\sum_{w_1w_2w_3 \ni class} n(w_1w_2w_3)}{\sum_{w_1w_2 \ni H} n(w_1w_2)} \tag{10}$$

matches the class count observed in the training data and also assigns the highest probability to the training data given a particular partition. The likelihood of observing the training data is a convex function of the factors therefore any iterative method to determine the factors that increases the likelihood at each step, i.e., hill climbing, is guaranteed to converge to the optimum factors. The method of gradient descent can be used to get update formulas for iteratively adjusting the factors. For an in-depth discussion of this algorithm see W. T. Vetterling, S. A. Teukolsky, W. H. Press, B. P. Flannery, *Numerical Recipes, Example Book (C)*, Cambridge University Press, pp. 125–139 (1988), herein incorporated by reference. Another method for determining the factors is the generalized iterative scaling (GIS) method. A distinctive characteristic of the present invention is that derived counts i.e., the constraint counts or class counts, are input into the iterative method to determine the factors in the factor determinator 312 as shown in step 428. For an in-depth discussion of the GIS algorithm see J. N. Darroch and D. Ratcliff, *Generalized Iterative Scaling for Log-Linear Models,* The Annals of Mathematical Statistics, Vol. 43, No. 5, pp. 1470–80 (1972), herein incorporated by reference.

Equation (10) shows the value of a factor after the first iteration of step 428. H is the history set of all trigrams. For example, for trigrams in $S_{123}$, H is the set of all $w_1w_2$ which when followed by $w_3$ would belong to the class $w_1w_2w_3$. $n(w_1w_2w_3)$ is equal to count of all trigrams in class $w_1w_2w_3$. $n(w_1w_2)$ is equal to the count of all trigrams having the history of $w_1w_2$.

Equation (11) shows an example of Equation (10). Equation (11) is based upon FIG. 6. Training data may be manipulated such that any one of many potential partitions exist. A partition is determined by using a particular set of threshold values. If different threshold values are chosen a different partition results. These threshold values enable the trigrams of the training data to be associated with a class. In FIG. 6 the partition is determined using threshold values of 3 for the trigram class, 3 for the bigram class and 2 for the unigram class. The trigrams associated with each class are shown in FIG. 7. A more detailed analysis of FIG. 6 and FIG. 7 occurs below. In Equation (11) the numerator is equal to the count of all trigrams associated a class in the unigram set. The denominator is equal to the sum of the counts of all trigrams having the same $w_1w_2$ as any trigram in the numerator, i.e., (2, 2, w), (3, 3, w). The trigrams whose count are considered in the denominator need not be associated with the unigram set. Equation (11) approximates the value of the factor associated with class (w, w, $w_3$) of this specific partition.

$$f_{s_3} \simeq \frac{n(2,2,3) + n(3,3,3)}{n(2,2,1) + n(2,2,3) + n(3,3,3)} = \frac{2+2}{5+2+2} = \frac{4}{9} \quad (11)$$

After all constraint counts are determined all of the trigrams in sets $S_{123}$, $S_{23}$, $S_3$ and the default constraint are numbered consecutively from 1 to K in the factor determinator 312. Therefore, $f_i$ refers to the factor associated with the class in which the $i^{th}$ trigram is a member.

If the Generalized Iterative Scaling algorithm is used in step 428 to determine the factors step 430 is the last step, i.e., convergence occurs in one iteration. If another algorithm is used, e.g. gradient descent, steps 430–432 may be repeated until convergence occurs as indicated in step 434. At each iteration, factor $f_i$ is updated in the factor determinator 312 during step 432 by multiplying this factor by the probability that the constraint occurs in the training data, i.e., d(i). This product is then divided by the model predicted value probability as determined in Equation (9), e.g., m(i). This updating equation is shown in Equation (12).

$$f_i^{new} = f_i^{old} \frac{d(i)}{m(i)} \quad (12)$$

For the first iteration $f_i^{old}$ is equal to one. The variable d(i) represents the probability that the trigram occurs in the training data. The size of the training data is N words. If the trigram is associated with a class in set $S_{123}$, then d(i) is determined using Equation (13). If the trigram is associated with a class in set $S_{23}$ then d(i) is determined using Equation (14). If the trigram is associated with a class in set $S_3$ then d(i) is determined using Equation (15). If the trigram is not associated with a class in any of the sets, and therefore has its complement count included in the default constraint, d(i) is determined using Equation (16).

$$d(i) = \frac{c([w_1w_2w_3]_i)}{N} \quad (13)$$

$$d(i) = \frac{cc([w_2w_3]_i)}{N} \quad (14)$$

$$d(i) = \frac{cc([w_3]_i)}{N} \quad (15)$$

$$d(K) = \frac{cc_0}{N} \quad (16)$$

The model predicted value probability for the $i^{th}$ constraint, m(i), is determined by using Equation (9) where the old factors are used, i.e., the values of the factors before being updated using Equation (12).

The present invention's definition of non-overlapping classes of a partition space leads to a significantly faster rate of convergence than traditional systems. For example, the present invention converges after two or three iterations as opposed to the trigram model based upon deleted interpolation which typically requires forty to fifty iterations. If the Generalized Iterative Scaling algorithm is used to determine the factors then convergence occurs in one iteration.

FIG. 5 is an example of the claimed method. In FIG. 5(a) nine trigrams $w_1w_2w_3$ and their count (c) are shown based upon a given set of training data. For clarity each word is represented by a number. The result of step 402 is shown by the count (c) column. A determination is made by the trigram set creator 304 in step 404 as to whether the count for each trigram is larger than a first threshold, which for this example will be 2. The trigrams which satisfy this test are placed in a class in set $S_{123}$ in step 406. These trigrams are: (2, 2, 1) whose count is five; and (2, 3, 2) whose count is three. No other trigrams have a count larger than the threshold.

FIG. 5(b) shows the group of trigrams not included in set $S_{123}$. From these bigrams, the bigram set creator 306 calculates a complement count for each putative bigram class in step 410. The result of step 410 is shown in FIG. 5(c). In step 412 each putative bigram class's complement count is compared to a second threshold value, which for this example will be two. If a putative bigram class's complement count is larger than the second threshold value the putative class is converted into a class and is associated with set $S_{23}$ in step 414. Set $S_{23}$ consists of the classes: (w, 3, 4) whose count is three; and (w, 2, 1) whose count is also three. Note that the count for trigram (w, 2, 1) does not include the count from trigram (2, 2, 1) because in the present invention each trigram is counted only once. No other bigrams have a complement count larger than the threshold.

FIG. 5(d) shows the putative bigram classes which are not associated with set $S_{23}$. FIG. 5(e) shows the group of trigrams not included in either classes associated with either set $S_{123}$ or set $S_{123}$ (recall that this non-classified group of trigrams are defined as unigrams). From these unigrams, the unigram set creator 308 calculates a complement count for each putative unigram class in step 418. The result of step 418 is shown in FIG. 5(f). In step 420 each putative unigram class's complement count is compared to a third threshold value, which for this example will be three. If a putative unigram class's complement count is larger than the third threshold value the putative unigram class is converted into a class and is associated with set $S_3$ in step 422. Putative unigram classes (w, w, 4) and (w, w, 8) both have a complement count of two. Note that since trigrams (2, 3, 4) and (7, 3, 4) are already associated with classes in $S_{23}$, they are ineligible in the present invention to be associated with classes in another set. This ensures that each trigram is only counted once. Therefore no trigrams satisfy the test of step 420. Set $S_3$ consequently is empty, i.e., there are no classes in set $S_3$.

The default constraint, $CC_0$, is determined in the default constraint creator 310 during step 426. The complement count of all putative unigram classes not associated with $S_3$ are summed together. In this example two putative unigram classes are not associated with $S_3$. Each of these putative unigram classes has a complement count of two. Therefore $CC_0$ is equal to four, i.e., 2+2.

Another improvement of the present invention over previous methods is that the present invention significantly reduces the number of trigram records. This reduction occurs because the present invention provides a more efficient model that requires fewer trigrams to achieve the same performance as previous models. The result is a reduction in the storage requirements for the language model. One reason for this reduction is that each trigram is associated with only one class. This lack of redundancy results in a more efficient model and a reduction in the number of trigram records that are necessary for a language model.

The allocation of memory available for use by a language modeling system varies. The present invention improves upon previous systems in that the claimed invention is flexible with respect to the amount of memory it requires for proper performance. For the claimed invention, the storing of n-grams in memory device 302 varies depending upon which class the n-gram is associated with. As an example, in order to store trigrams efficiently the following structure may be used: (a) for classes associated with $S_{123}$, i.e., $w_1w_2w_3$, each $w_1w_2$ combination is stored once and this information is shared for all trigrams having the same $w_1w_2$. For each class $w_3$ or an identifier must be saved along with the factor $f_{w1w2w3}$ of the class; therefore two pieces of information must be stored for each class associate with $S_{123}$; (b) for classes associated with $S_{23}$, i.e., $w_{2w}w_3$, each $w_2$ is stored once and this information is shared for all classes having the same $w_2$. For each class, $w_3$ or its identifier must be saved along with the factor $f_{w2w3}$ of the class, therefore two pieces of information must be stored for each class associated with $S_{23}$; (c) for classes associated with $S_3$, $w_3$ or its identifier must be saved along with the factor $f_{1w3}$ of the class, therefore two pieces of information must be stored for classes associated with $S_3$; (d) for the default constraint only its value needs to be stored.

The exact trigram storage structure is not as important as the flexibility of the claimed invention's memory requirement. The size of trigram record files is dominated by the class records of set $S_{123}$ because usually there are significantly more classes in this set than in the other sets. The claimed invention can reduce the number of trigrams associated with classes in set $S_{123}$ by increasing the threshold values. The claimed invention significantly reduces the amount of storage necessary over previous methods by utilizing non-overlapping classes in the partition space. For simplicity assume that two pieces of information must be stored for each class in set $S_{123}$, set $S_{23}$ and set $S_3$ and one piece of information must be stored for the default constraint.

Using the example in FIG. 6, if the first and second threshold values are set equal to three and the third threshold value is set equal to two then the resulting sets are shown in FIG. 7. In terms of memory requirement the results shown in FIG. 7 requires storage of six classes in $S_{123}$ and one class in $S_3$, i.e., 15 pieces of information if we have threshold values equal to (3, 3, 2), i.e., (6 classes×2)+(0 classes×2)+(1 classes×2)+1=15.

Using the interpolated trigram language model, discussed above, the example in FIG. 6 requires a storage capacity as shown in FIG. 8. Every trigram, every bigram and every unigram is stored. This requires 35 pieces of information, i.e., (8 trigrams×2)+(6 bigrams×2)+(3 unigrams×2)+1=35.

Using this example the present system and method provide a memory savings of approximately 57 percent.

In an experiment with a vocabulary size of 43,524 words and a training corpus of 5,000,000 words, 195,235 trigrams constraints were collected using a first threshold of three, 160,340 bigram constraints were collected using a second threshold of three and 35,615 unigram constraints were collected using a third threshold value of two. The resulting model had a perplexity of 169 on an independent test corpus of about 451,000 words. In general the perplexity of a language model represents the "average" number of choices that probabilistically may occur after any given two words. This model requires storing approximately (391,000×2) pieces of data, i.e., 782,000. The perplexity obtained using the same threshold values of trigrams and bigrams and unigrams, and therefore approximately the same storage requirements, but modeled by the interpolated trigram language model was 282. In order to match the perplexity of the present system, the interpolated language model, discussed above, has a memory requirement that is approximately nine times larger than the memory requirement of the present invention. Having a threshold of zero, in this experiment, the interpolated trigram model has a perplexity of 170 which approximately matches the perplexity of the present invention. With this threshold the interpolated trigram model must store approximately 2,517,000 trigrams, 939,000 bigrams and 48,000 unigrams. This is a total of (3,504,000×2), i.e., 7,008,000 pieces of data.

While the invention has been particularly shown and described with reference to a preferred embodiment thereof, it will be understood by those skilled in the art that various change in form and details may be made therein without departing from the spirit and scope of the invention.

What is claimed is:

1. A computer based language modelling system receiving data in the form of training text divided into a series of n-grams, each n-gram comprising a series of "n" words, each n-gram having an associated count, the history of an n-gram being represented by the initial n-1 words of the n-gram, comprising:

a language modelling means for determining a conditional probability of a predicted word given the previous (n-1) words, comprising:

a memory means for storing the data;

a separating means coupled to said memory means for examining each word within each n-gram and classifying each n-gram into one of one or more classes based upon one or more words in a given n-gram, each class having one or more similar n-grams associated with said class, said similar n-grams having the same predicted word and x previous words, where x varies from (n-1) to zero, to associate each n-gram with exactly one of said one or more classes, each class is identified with one of one or more sets based upon the value of x used when determining the class of the n-gram;

a factor means coupled to the output of said separating means and to said memory means for determining a factor for each of said one or more classes, said factor representing the relative strength of predicting said predicted word given the previous (n-1) words, the value of each factor being approximately equal to the ratio of the sum of the counts of each n-gram associated with a given class over the sum of the counts of all (n-1)-grams which when followed by said predicted word would belong to said given class; and a conditional probability means coupled to the output of said factor means for determining said conditional probability of the occurrence of said predicted word given that a particular sequence of (n-1) previous words have occurred using said factors, said conditional probability approximately equal to the ratio of a first factor, said first factor associated with the class that a given n-gram is associated with, said given n-gram equal to said predicted word and the history of said predicted word, the history equal to a particular sequence of (n-1) previous words, over the sum of one or more factors, said one or more factors associated with all of the classes of n-grams obtained by using said particular sequence of (n-1) words followed by any word of the vocabulary.

2. The system of claim 1, further comprising:

a user interface for accepting input data in the form of spoken sounds;

a signal processor coupled to the output of said user interface for creating a series of feature vector signals based upon said spoken sounds;

a labelling means coupled to the output of said signal processor for labelling said series of feature vector signals with a label from a label alphabet to produce a series of labelled feature vector signals; and a matching means coupled to the output of said labelling means for creating and updating one or more sequences of word-series hypotheses which represent said sounds input into said user interface which were spoken up to a given point in time, comprising:

a second memory means for storing said sequences of word-series hypotheses, a search controlling means coupled to an acoustic matching means, said language modelling means, and to said second memory means for controlling the sequence of performance of said acoustic matching means and of said language modelling means, and for controlling the inputs into said language modelling means in the form of signals representing a current word from a word choice set obtained from said acoustic matching means, a sequence of (n-1) previous words obtained from said second memory means, said (n-1) previous words being the last (n-1) words in one of the sequences of word-series hypotheses, said sequences of word-series hypotheses resulting from previous outputs of said matching means, said acoustic matching means coupled to said search controlling means for comparing an acoustic parameter vector signal with said labelled feature vector signals to reduce the number of word choices that likely represent said labelled feature vector signals, said word choices are output to the search controlling means which provides each of said word choices as an input to said language modelling means, said language modelling means determines a score for each of the word choices, said score is an estimate of the conditional probability of each of said word choices given that each of the sequences of word-series hypotheses have occurred, each of said sequences of word-series hypotheses is input into said language modelling means from said search controlling means.

3. The system of claim 1, wherein said separating means further comprises:

a first classifying means for classifying each n-gram having a count above a first threshold value in a class;

a first word-series counter/classifier means coupled to the output of said first classifying means and to said memory means, comprising:

a first complement count means for determining a first complement count for each of one or more putative classes using all n-grams not previously classified, said putative classes being the classes that can possibly exist based upon the last (n-1) words of all the n-grams not previously classified, a second classifying means coupled to said first complement count means for classifying each n-gram not previously classified into one of one or more first additional classes if the complement count of a corresponding putative class is above a second threshold value, each of said one or more first additional classes including one or more of said n-grams not previously classified, each n-gram in a particular class having the same last n-1 words, and a default constraining means coupled to said memory means for determining a value representing the sum of the counts of all of said n-grams not associated with any of said classes.

4. The system of claim 3, further comprising:

one or more additional word-series counter/classifier means coupled serially to and between said first word-series counter/classifier and said default constraining means, each word-series counter/classifier comprising:

a second complement count means for determining a complement count for each of one or more additional putative classes using all of said n-grams not heretofore classified;

a third classifying means coupled to said second complement count means for classifying each n-gram into one of one or more second additional classes if the complement count of a corresponding putative class is above an additional threshold value, each of said one or more second additional classes including one or more n-grams not previously classified, each n-gram in a particular class having the same last x words, x equal to (n-2) for the first additional word-series counter/classifier means and reduced by one for each additional word-series counter/classifier means thereafter.

5. A method for developing scalable n-gram language models where data is received in the form of training text which is stored in a memory module and divided into a series of n-grams, each n-gram comprising a series of "n" words and represented in a memory unit, the history of an n-gram being represented by the initial (n-1) words of the n-gram, comprising:

(1) searching each memory location representing an n-gram to determine a first count for each of said n-grams, and storing said first count in a first count memory location;

(2) comparing said first count of a given n-gram with a first predetermined memory location representing a first threshold value, if said first count of said given n-gram is greater than said first threshold value identify said first count of said given n-gram with a first class count memory location representing a count for a first class, said first class having said given n-gram as a member;

(3) repeating step 2 for all n-grams;

(4) searching all memory locations representing all of said n-grams which are not previously classified to determine a first complement count for each of one or more first putative classes, said one or more first putative classes being the classes that can possibly exist based upon the last (n-1) words of all of the n-grams not previously classified, each putative class having one or more of the not previously classified n-grams having the same last (n-1) words, said first complement count to be stored in a first complement count memory location;

(5) comparing said first complement count of a given putative class of said one or more first putative classes with a value located in a second predetermined memory location representing a second threshold value, if said first complement count is greater than said second threshold value identify said first complement count with an additional class count memory location representing said first complement count for said given putative class, said given putative class is determined to be a class if the complement count of said given putative class is greater than said second threshold value;

(6) repeating step (5) for all putative classes identified in step (4);

(7) summing the values, in a processor, of the complement counts of all of the putative classes which have not been determined to be a class and storing the sum in a default constraint count memory location representing a default constraint class;

(8) manipulating said values in said first count memory location, the complement count memory locations and said default constraint memory location representing said first counts, subsequent complement counts and said default constraint in said processor, and storing the value of the results of said manipulation in a set of factor memory locations representing a set of factors, each factor associated with a class, representing the relative strength of predicting a word given the previous (n-1) words, the value of each factor being approximately equal to the ratio of the sum of the counts of each n-gram associated with a given class over the sum of all (n-1)-grams which when followed by any another word would belong to the given class; and (9) manipulating said values of said factor memory locations, in said processor, the result representing a probability that a particular word will occur given that a specific n-1 words have previously occurred.

6. The method of claim 5, wherein determining a first complement count in step (4) includes summing the values, in a processor, of said first count memory locations for all of the n-grams, not previously classified with a class, which have the same last (n-1) words.

7. The method of claim 5, further comprising the step of (6a) immediately following step (6), searching all memory locations representing all of said n-grams which are not previously classified to determine an additional complement count for each of one or more additional putative classes, said one or more additional putative classes being the classes that can possibly exist based upon the last (n-x) words of all of the n-grams not previously classified, x being equal to 2 the first time step (6a) is executed and increased by one each additional execution of step (6a), each putative class having one or more of the not previously classified n-grams having the same last (n-x) words, said additional complement count to be stored in an additional complement count memory location;

8. The method of claim 7, further comprising the step of (6b) immediately following step (6a), comparing the additional complement count for a given putative class of said one or more additional putative classes with a value located in an additional predetermined memory location representing an additional threshold value, if said additional complement count is greater than said additional threshold value identify said additional complement count with a second additional class count memory location representing said additional complement count for said given putative class, said given putative class is determined to be a class if its complement count is greater than said additional threshold value;

9. The method of claim 8, further comprising the step of (6c) immediately following step (6b), repeating step (6b) for all putative classes identified in step (6a);

10. The method of claim 9, further comprising the step of (6d) immediately following step (6c), repeating steps (6a)–(6c) until (n-x) is equal to one.

11. The method of claim 10, further comprising the step of

1(b) following step (1a), determining said threshold values, and therefore a particular partition, based upon said amount of memory storage to be used.

12. The method of claim 5, further comprising the step of

1(a) preceding step (2), determining an amount of memory storage to be used.

13. The method of claim 5, wherein step (8) includes manipulating said values in said first count memory location and the complement count memory locations using a generalized iterative scaling technique for log-linear models.

14. The method of claim 5, wherein step (8) includes manipulating said values in said first count memory location and the complement count memory locations using a gradient descent model.

15. The method of claim 5, further comprising the step of

(10) following step (9) manipulating said values stored in said factor memory locations to update each of said factors.

16. The method of claim 15, further comprising the step of

(11) following step (10) repeating steps (9) and (10) until convergence is obtained for the factor values.

17. The method of claim 16, wherein convergence is obtained in one iteration.

18. In a computer based language modelling system receiving data in the form of a series of n-grams, each n-gram comprising a series of "n" words ($w_1, w_2, \ldots, w_n$), each n-gram having an associated count, a method of classifying the n-grams into non-redundant classes, the method comprising the steps of:

(a) comparing the count of each n-gram to a first threshold value and classifying each n-gram with a count greater than said first threshold in a first class;

(b) associating all n-grams not classified in step (a) with a putative (n-1)-gram class, each said putative (n-1)-gram class having the same last "n-1" words ($w_2, w_3, \ldots, w_n$);

(c) summing the counts of each n-gram in said putative (n-1)-gram class to establish a complement count for each said putative (n-1)-gram class; and (d) comparing said complement count of each said putative (n-1)-gram class to a second threshold value and classifying each said putative (n-1)-gram class with a count greater than said second threshold in a second class.

19. The method of claim 18, wherein steps (a) to (d) are repeated until only unclassified putative 1-grams are left.

20. The method of claim 19, further comprising the step of grouping all said unclassified putative 1-grams into a default class.

21. In a computer based language modelling system receiving data in the form of a series of n-grams, wherein each n-gram comprises a series of "n" words ($w_1, w_2, \ldots, w_n$, and each n-gram has an associated count, a system for classifying the n-grams into non-redundant classes, comprising:

means for comparing the count of each n-gram to a first threshold value and classifying each n-gram with a count greater than said first threshold in a first class;

means for associating all n-grams not classified by said comparing means with a putative (n-1)-gram class, each said putative (n-1)-gram class having the same last "n-1" words ($w_2, w_3, \ldots, w_n$);

means for summing the counts of each n-gram in said putative (n-1)-gram class to establish a complement count for each said putative (n-1)-gram class; and means for comparing said complement count of each said putative (n-1)-gram class to a second threshold value and classifying each said putative (n-1)-gram class with a count greater than said second threshold in a second class.

* * * * *

UNITED STATES PATENT AND TRADEMARK OFFICE
CERTIFICATE OF CORRECTION

PATENT NO. : 5,467,425            Page 1 of 2
DATED     : November 14, 1995
INVENTOR(S) : Lau, et al It is certified that error appears in the above-indentified patent and that said Letters Patent is hereby corrected as shown below:

Column 7, line 4, $$\text{Equation (6), should read } -cc(w_2 w_3) = \sum_{w_3 w w_2 w_3 \in S_{123}} c(w w_2 w_3)-$$

instead of "$2\ 3 \quad\quad \sum_{w_3 w w_2 \in}$".

Column 7, line 34, $$\text{Equation (7), should read } -cc(w_3) = \sum_{w_3 w w_3 \in S_{23}} cc(w w_3)-$$

instead of "$cc(w_3) = \sum_{w_3 w w \in}$".

UNITED STATES PATENT AND TRADEMARK OFFICE
CERTIFICATE OF CORRECTION

PATENT NO.   : 5,467,425
DATED        : November 14, 1995
INVENTOR(S)  : Lau, et al It is certified that error appears in the above-indentified patent and that said Letters Patent is hereby corrected as shown below:

Column 7, lines 63-64,
Equation (8), should read $--cc_0 = \sum_{w \ni w \in S_j} cc(w)--$ instead of "$cc_0 = \sum_{w \ni w w \in}$".

Signed and Sealed this

Seventeenth Day of September, 1996

Bruce Lehman

BRUCE LEHMAN

*Attest:*

*Attesting Officer*   Commissioner of Patents and Trademarks